Dec. 21, 1965   E. H. EPPRECHT   3,224,410
SHAFT ROTATION INDICATOR
Filed Nov. 8, 1963
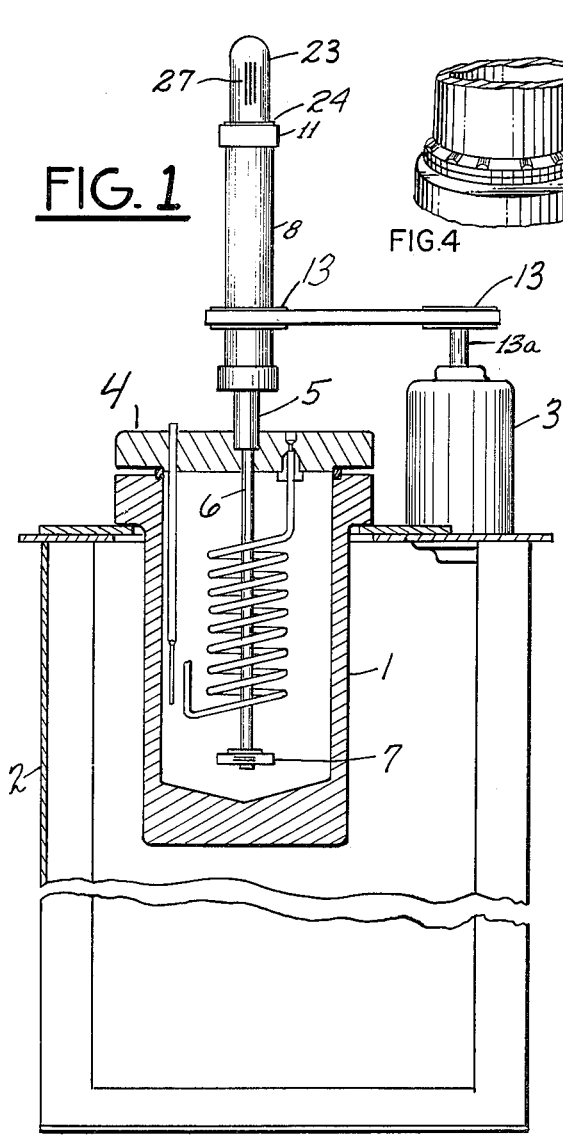
FIG. 1
FIG. 4
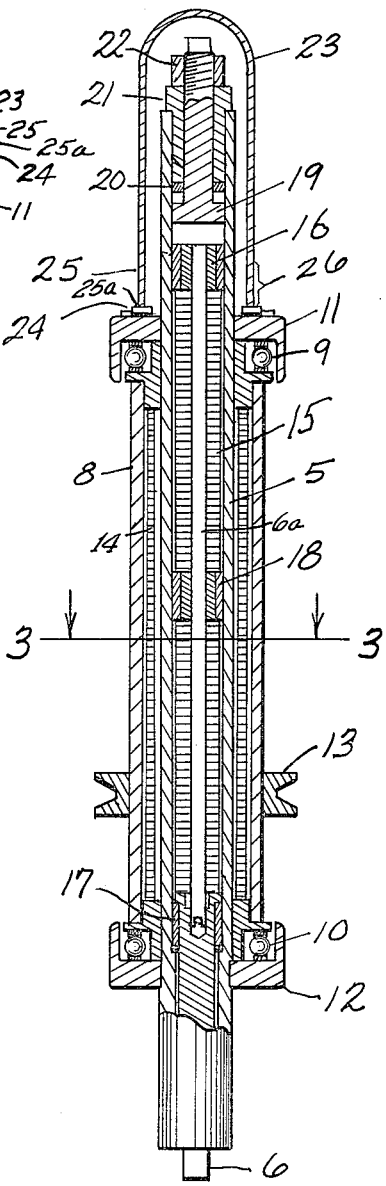
FIG. 2
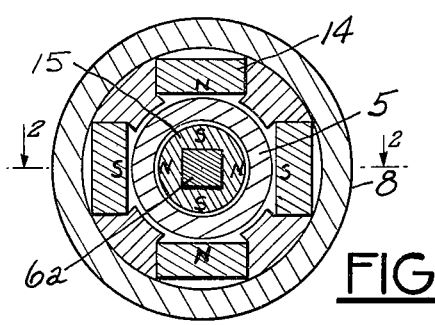
FIG. 3
INVENTOR.
Edward H Epprecht
BY
Ralph Hammar
Attorney

United States Patent Office 3,224,410
Patented Dec. 21, 1965

3,224,410
SHAFT ROTATION INDICATOR
Edward H. Epprecht, Fairview, Pa., assignor to Autoclave Engineers, Inc., Erie, Pa., a corporation of Pennsylvania
Filed Nov. 8, 1963, Ser. No. 322,303
2 Claims. (Cl. 116—115)

This invention is a shaft rotation indicator for magnetic drives where the rotation of the driven shaft cannot be observed. It is useful in autoclaves for chemical reactions where increasing viscosity may stall the agitator shaft.

In the drawing, FIG. 1 is an elevation, partly in section, of an autoclave, FIG. 2 is an enlarged section on line 2—2 of FIG. 3 through the magnetic drive, FIG. 3 is a further enlarged section on line 3—3 of FIG. 2, and FIG. 4 is a fragmentary side elevation of the lower end of the shaft rotation indicator and the associated bearing and supporting structure.

The autoclave body 1 is mounted on a stand 2 which carries a drive motor 3 and the usual instruments (not shown) for measuring the pressure, temperature and other operating conditions. The autoclave body is closed by a cover 4 having fixed at its center an upstanding non magnetic metal tube 5 in which is journaled a shaft 6 carrying at its lower end an agitator 7. The agitator shaft 6 is conveniently made in several sections connected end to end.

The drive for the agitator shaft, shown in greater detail in Patent 2,996,363 comprises an external driver magnet assembly consisting of an outer steel housing 8 journaled at its upper and lower ends in bearings 9, 10 mounted on the tube 5 by bearing support collars 11 and 12. The housing 8 is driven by the motor 3 through a drive pulley 13. The housing 8 rotates at a definite speed compared to the motor speed.

Within the driver housing 8 are four rows of permanent magnets 14 on 90° spacing and polarized as indicated. The driven magnets are cylindrical magnets 15 telescoped over a keyed section 6a on the agitator shaft 6 and having alternating north and south poles at 90° intervals as indicated. Concentricity of the magnets 15 relative to the tube 5 is maintained by bearings 16 and 17 at the upper and lower ends of the keyed section 6a of the agitator shaft and by one or more intermediate bearings 18.

The full operating pressure of the autoclave is present within the tube 5. The upper end of the tube is, accordingly, closed by a cover 19 and packing 20 arranged between the cover and a nut 21 held in place by a lock nut 22. Under operating conditions, the agitator shaft 6 is completely sealed within the autoclave and its rotation cannot be observed.

Until the maximum load is exceeded, the magnets 14 and 15 are always locked in phase with each other. When the maximum load is exceeded, the magnets 15 remain stationary. This is a property of the synchronous magnet drive provided by the magnets 14 and 15. Accordingly, the rotation of the driver housing 8 is no indication of whether or not the agitator shaft 6 is rotating.

Indication of the rotation of the agitator shaft is provided by a metal cup or sleeve 23 supported on a suitable thrust or pivot bearing, such as the roller thrust bearing 24, and having a section 25 adjacent the rim 25a subject to the magnet field of the uppermost magnets 15 arranged in the region 26. While the lower driven magnets 15 are opposed to the driving magnets 14, the uppermost magnets 15 at the upper or outer end of the tube 5 extend above the magnets 14 and create a magnetic field in the region 26. If the agitator shaft 6 is rotating, eddy currents will be generated in the metal cup 23 causing rotation of the cup 23 on the same principle as the induction motor. It is not necessary that the cup 23 rotate at the same speed as the agitator shaft 6. The speed of the agitator shaft 6 can easily be determined by a tachometer applied to the shaft 13a of the motor 3. The rotation of the cup 23 does provide an indication that the agitator shaft is turning. In order to make the rotation of the cup 23 more readily visible, a distinguishing mark or marks 27 may be applied to the outer surface of the cup. When the cup is stationary, the marks will be readily visible.

The indicator is of substantial advantage in chemical research where increases in viscosity may result in stalling of the agitator shaft.

What is claimed as new is:

1. In an autoclave having a tube with its inner end open to the interior of the autoclave and its outer end closed and presented to the atmosphere exterior of the autoclave, driving magnets rotatable about the exterior of the tube, an agitator shaft within the tube, driven magnets within the tube keyed to the agitator shaft and magnetically coupled to the driving magnets through the walls of the tube, some of the driven magnets being opposite the driving magnets and other of the driven magnets being at the outer end of the tube and out of opposition to the driving magnets and sending magnetic flux through the outer end of the tube, and a metal sleeve journaled on the outer end of the tube in position to intercept magnetic flux from said other driven magnets whereby rotation of the agitator shaft will induce eddy currents in the sleeve and cause rotation of the sleeve to indicate that the agitator shaft is rotating.

2. In an autoclave having a vertical tube with its lower end open to the interior of the autoclave and its upper end closed and presented to the atmosphere exterior of the autoclave, driving magnets rotatable about the exterior of the tube, an agitator shaft within the tube, driven magnets within the tube keyed to the agitator shaft and magnetically coupled to the driving magnets through the walls of the tube, some of the driven magnets being at the upper end of the tube and out of opposition to the driving magnets and sending magnetic flux through said upper end of the tube, and an inverted metal cup telescoped over and journaled on the upper end of the tube in position to intercept magnetic flux from the driven magnets at the upper end of the tube whereby rotation of the agitator shaft will induce eddy currents in the cup and cause rotation of the cup to indicate that the agitator shaft is rotating.

References Cited by the Examiner
UNITED STATES PATENTS

| 2,241,983 | 5/1941 | Connolly | 312—104 |
| 2,601,784 | 7/1952 | Rose | 310—104 |
| 2,836,144 | 5/1958 | Morphis | 116—129 |
| 2,996,363 | 8/1961 | Ruyak | 23—290 |

LOUIS J. CAPOZI, *Primary Examiner.*